(12) United States Patent
Spalink

(10) Patent No.: US 7,720,110 B2
(45) Date of Patent: *May 18, 2010

(54) CYCLE SYNCHRONIZATION BETWEEN INTERCONNECTED SUB-NETWORKS

(75) Inventor: Gerd Spalink, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 35 days.

This patent is subject to a terminal disclaimer.

(21) Appl. No.: 11/610,320

(22) Filed: Dec. 13, 2006

(65) Prior Publication Data

US 2007/0116062 A1 May 24, 2007

Related U.S. Application Data

(63) Continuation of application No. 09/972,208, filed on Oct. 5, 2001, now Pat. No. 7,184,449.

(30) Foreign Application Priority Data

Oct. 10, 2000 (EP) ................................. 00122026

(51) Int. Cl.
*H04J 3/06* (2006.01)
(52) U.S. Cl. ...................................... 370/516; 370/503
(58) Field of Classification Search .......... 370/503–520
See application file for complete search history.

(56) References Cited

U.S. PATENT DOCUMENTS

| 5,608,731 | A | 3/1997 | Upp et al. |
| 5,907,685 | A | 5/1999 | Douceur |
| 5,918,040 | A | 6/1999 | Jarvis |
| 6,032,261 | A | 2/2000 | Hulyalkar |
| 6,128,318 | A | 10/2000 | Sato |
| 6,483,825 | B2 | 11/2002 | Seta |
| 6,542,754 | B1 | 4/2003 | Sayers et al. |
| 6,967,936 | B1 * | 11/2005 | Laroia et al. ................ 370/329 |
| 7,124,227 | B2 | 10/2006 | Gädeken et al. |
| 7,184,449 | B2 * | 2/2007 | Spalink ..................... 370/508 |
| 2001/0023452 | A1 | 9/2001 | Spalink et al. |

FOREIGN PATENT DOCUMENTS

| EP | 0 722 233 | 7/1996 |
| EP | 0 942 556 | 9/1999 |
| EP | 0 994 605 | 4/2000 |
| EP | 1 009 116 | 6/2000 |
| WO | WO 99/35587 | 7/1999 |
| WO | WO 99/38287 | 7/1999 |
| WO | WO 99/59047 | 11/1999 |

\* cited by examiner

*Primary Examiner*—Phuc H Tran
(74) *Attorney, Agent, or Firm*—Oblon, Spivak, McClelland, Maier & Neustadt, L.L.P.

(57) ABSTRACT

A method to perform a cycle synchronization between interconnected sub-networks, in which a reference node connected to one of the sub-networks transmits a respective cycle time information to cycle masters of all other sub-networks at recurring time instants, and the cycle masters of all other sub-networks adjust their cycle time accordingly. An adjustment of the cycle time within a cycle master is performed by determining a first time interval ($t1$, $t1'$) in-between two receptions of cycle time information from the reference node with an own clock, determining a second time interval ($t2$, $t2'$) in-between two corresponding transmissions of cycle time information from the reference node on basis of the received cycle time information, comparing the first time interval ($t1$, $t1'$) and the second time interval ($t2$, $t2'$), and adjusting the own cycle length according to the comparison result.

26 Claims, 3 Drawing Sheets

CYCLE SYNCHRONIZATION BETWEEN INTERCONNECTED SUB-NETWORKS

CROSS-REFERENCE TO RELATED APPLICATIONS

This application is a Continuation of U.S. patent application Ser. No. 09/972,208, filed Oct. 5, 2001, and claims priority to European Patent Application No. 00 122 026.8, filed Oct. 10, 2000.

BACKGROUND OF THE INVENTION

1. Field of the Invention

The present invention relates to a method to perform a cycle synchronization between interconnected sub-networks and a cycle synchronizator adapted to perform said method.

2. Discussion of the Background

It is known to interconnect sub-networks, e.g. with long delay bi-directional connections to extend a network to a wider area. In particular, this technique is used to interconnect several IEEE 1394 serial buses to extend an IEEE 1394 network, e.g. through a whole house. The basic topology of such a connection is shown in FIG. 1. A first interface 20 is part of a first IEEE 1394 serial bus 21 which might consist of a number of IEEE 1394 nodes. A second interface 22 is part of a second IEEE 1394 serial bus 23 which might comprise another number of IEEE 1394 nodes. The first interface 21 and the second interface 22 are connected via a long delay bi-directional connection 24 which might be, but is not restricted to a coax cable medium.

Independent IEEE 1394 buses must be synchronized to have the same cycle rate. In particular, the IEEE 1394 standard mandates that for opened isochronous channels an isochronous packet is sent in every isochronous cycle. To ensure that isochronous transfers between the interconnected IEEE 1394 buses work, it must be ensured that all buses have the same frequency of isochronous cycles.

SUMMARY OF THE INVENTION

Therefore, it is the object underlying the present invention to provide a method to perform a cycle synchronization between interconnected sub-networks and a cycle synchronizator adapted to perform said method.

The method according to the present invention is defined in independent claim 1 and the cycle synchronizator according to present invention is defined in independent claim 12. Preferred embodiments thereof are respectively defined in the dependent subclaims.

The method to perform a cycle synchronization between interconnected sub-networks according to the present invention is characterized in that a reference node connected to one of the sub-networks transmits a respective cycle time information to cycle masters of all other sub-networks at recurring time instants, and the cycle masters of all other sub-networks adjust their cycle time accordingly.

Therewith, the present invention offers a method to synchronize several interconnected sub-networks which is independent of the connection between the sub-networks, since with the transmission of cycle time information of a reference node no relying on a clock frequency used for the transmission through the connection through sub-networks is necessary. After reception of the cycle time information each cycle master of the other sub-networks can adjust their cycle time accordingly so that in turn the cycle frequency in an IEEE 1394 serial bus connected to a respective cycle gets adjusted.

Therefore, in a network with N sub-networks N−1 cycle masters are required to adjust their cycle time and the remaining sub-network has to comprise the reference node transmitting its time information to the N−1 cycle masters of the other sub-networks. Preferably, the reference node and the cycle masters are arranged within a respective interface of the sub-network which is connected to the interconnection of all sub-networks.

According to the present invention an adjustment of the cycle time within a cycle master might be performed by the following steps: Determining a first time interval in-between two receptions of cycle time information from the reference node with an own clock, determining a second time interval in-between corresponding transmission of cycle time information from the reference node on basis of the received cycle time information, comparing the first and second time intervals and adjusting the own cycle time according to the comparison result. Therefore, a large scale integration is possible.

Further, the comparison of the first and the second time intervals according to the present invention might consider a preceding adjustment of the own cycle time, the adjustment of the own cycle time within a cycle master might be performed in a step-wise manner and/or the adjustment of the own cycle time within a cycle master might be performed by adjusting a local number of clocks within one cycle.

In particular, in the latter case the adjustment of the own cycle time within a cycle master is performed by setting the local number of clocks equal to an ideal number of clocks of one cycle in case the first time interval and the second time interval are identical, smaller than an ideal number of clocks of one cycle in case the first time interval is smaller than the second time interval and larger than an ideal number of clocks in case the first time interval is larger than the second time interval. In particular, these features enable a very easy and therefore reliable method to perform the cycle synchronization between interconnected sub-networks according to the present invention which is independent from the transmission method used in-between the sub-networks.

The stepwidth of setting the local number of clocks smaller or larger than the ideal number of clocks might be determined according to the difference of the first and second time intervals. In this case it is possible to determine how fast the sychronization should be achieved and/or to consider smaller and larger deviations of the cycle timers within the cycle masters.

According to the present invention preferably the cycle time information transmitted by the reference node is a content of its cycle time register. In this case the adjustment of the own cycle time within a cycle master is preferably performed by adjusting the average difference between a time interval of two transmissions of cycle time information of the reference node which is determined by subtracting two succeeding received contents of the cycle time register of the reference node and a time interval of two samplings of the own cycle timer which is determined by subtracting two succeeding sampled contents of the own cycle time register plus a corrective difference to be zero. Of course, also other than two succeeding transmissions could be used, but in this case the hardware design to realize a cycle synchronizator according to the present invention leads to an increased cost. Further preferably, the corrective difference corresponds to the preceding adjustment.

Further preferably, according to the present invention the recurring time instants are determined to a regular time interval with a small variation.

The cycle synchronizator according to the present invention is therefore characterized by a clock offset estimation means to determine a timing error of an own cycle timer, and a cycle adjustment loop receiving the timing error determined by said clock offset estimation means to adjust the own cycle timer to reduce its timing error. Preferably, a de-jitter filter is arranged in-between the clock offset estimation means and the cycle adjustment loop to filter said determined timing error.

Therefore, in case the present invention is applied to a distributed IEEE 1394 network, i.e. several IEEE 1394 serial buses which are regarded as sub-networks are interconnected, e.g. by a long delay, bi-directional connection provides advantages in that the cycle synchronization is based on free-running oscillators of the cycle masters and standard IEEE 1394 physical interfaces can be used, since the cycle synchronization is based on a timing error of the own cycle timer which can be determined on basis of the transmission of cycle time information of a reference node in the network. Additionally, the reference node does not need to be a cycle master, i.e. the reference node can be predetermined.

BRIEF DESCRIPTION OF THE DRAWINGS

Further features and advantages of the present invention will be apparent from the following detailed description of an exemplary embodiment thereof taken in conjunction with the accompanying drawings, in which.

DESCRIPTION OF THE PREFERRED EMBODIMENTS

The following preferred embodiment of the present invention is adapted to the IEEE 1394 standard. However, as mentioned above, the present invention is not restricted thereto.

Figure 1:
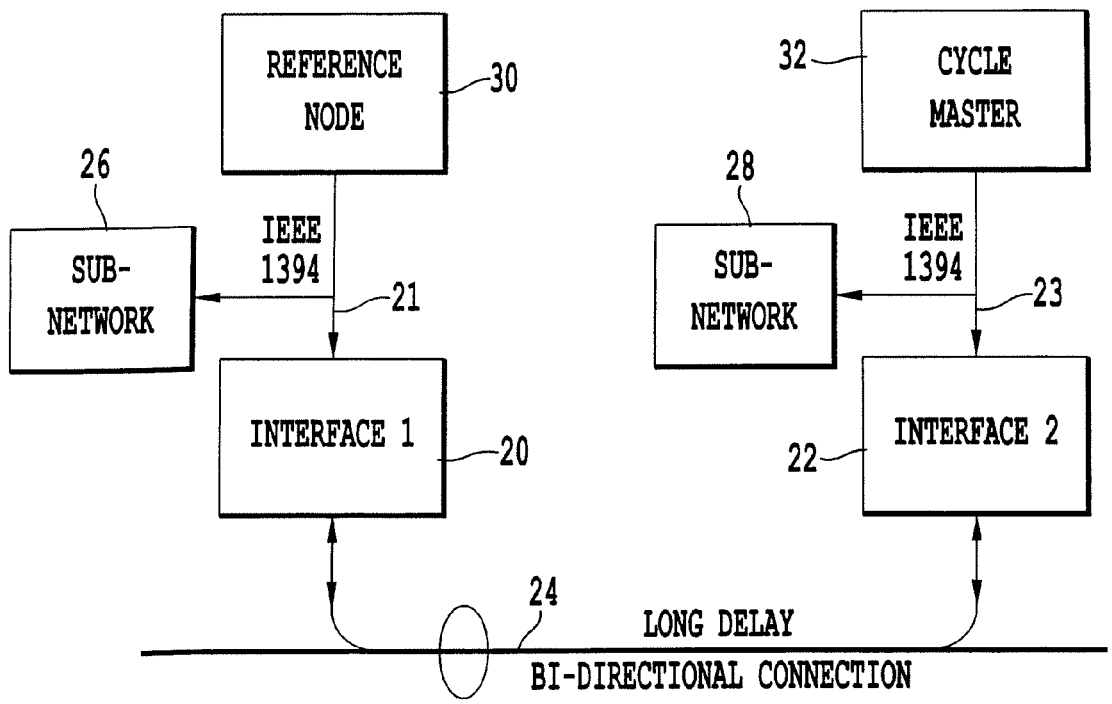
FIG. 1 shows an overview of a simple long delay IEEE 1394 network.

Every IEEE 1394 node maintains cycle time information in a node. For example, FIG. 1 shows a cycle master 30 that is chosen to be a reference node and a cycle master 32. This is basically a register that is incremented by a local, free-running clock of 24.576 MHz or integer multiples of that. According to the present invention this cycle time information is transmitted at regular instants via the interconnection of several sub-networks 26 and 28, in case of the example shown in FIG. 1 via the long delay bi-directional connection 24. The basic assumption of this method is that transmission of the cycle occurs at recurring time instants, preferably regular intervals, e.g. every 10 ms. Further, the exact value of that interval is not important since the exact value can be recovered from the difference of two transmitted samples of the cycle time register and the corresponding time stamps of the receiver will be sampled at the instant when the transmitted samples are received.

Figure 2:
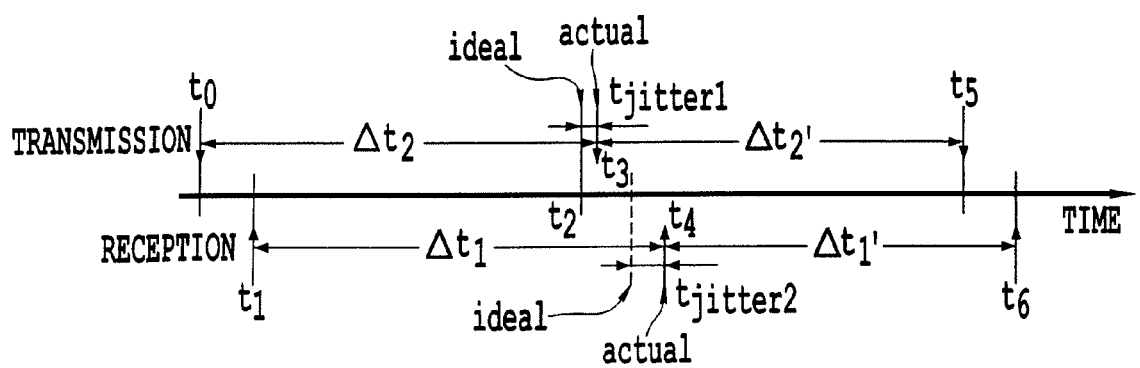
FIG. 2 shows a timing diagram of a first preferred embodiment according to the present invention.

FIG. 2 shows an example of timing of the transmission and reception of the cycle time. The node which has been chosen to be the reference node transmits the time at least to all other nodes comprising a cycle master. As mentioned above, the reference node is not required to be the cycle master within its connected IEEE 1394 sub-network. As shown in FIG. 2, the reference node samples its local cycle time register at regular instants, i.e. at a first transmission time $t_0$, a second transmission time $t_3$, and a third transmission time $t_5$ at which the contents of the cycle time register are respectively transmitted. It also shown in FIG. 2 that the second transmission time $t_3$, which is an actual transmission time, differs from an ideal second transmission time $t_2$ by a time difference $t_{jitter1}$. After a respective transmission of the contents of the cycle time register these contents are received at a first reception time $t_1$, a second reception time $t_4$, and a third reception time $t_6$. Similar to the case of the transmission it is shown in FIG. 2 that the actual reception of the transmitted cycle time register content at the second reception time $t_4$ differs from an ideal reception thereof. The difference in-between the ideal and the later actual second reception time is labelled with $t_{jitter2}$. A difference in-between the first and second actual transmission times is determined to $\Delta t_2$ and in-between the second and third actual transmission times to $\Delta t_{2'}$. A difference in-between the first and second actual reception times is determined to $\Delta t_1$ and in-between the second and third actual reception times to $\Delta t_{1'}$.

To allow for significant jitter to occur both on the transmitter and on the receiver side according to the present invention an optional filtering can be performed which limits the cycle length adjustment range to +/−1 clock and/or which uses a de-jitter filter.

After transmission, the receiving node samples its own local cycle timer at the instant when it receives the remote cycle time information. In the standard IEEE 1394 node, one cycle has a duration of 3072 clocks of a 24,576 MHz oscillator. According to the preferred embodiment of the present invention shown and described in the following, a cycle timer is used where the duration of the cycle can be adjusted to 3071, 3072 or 3073 clocks. However, a variable duration might also be implemented. The information of the remote and local cycle time registers is used to adjust the local number of clocks per cycle.

Figure 3:
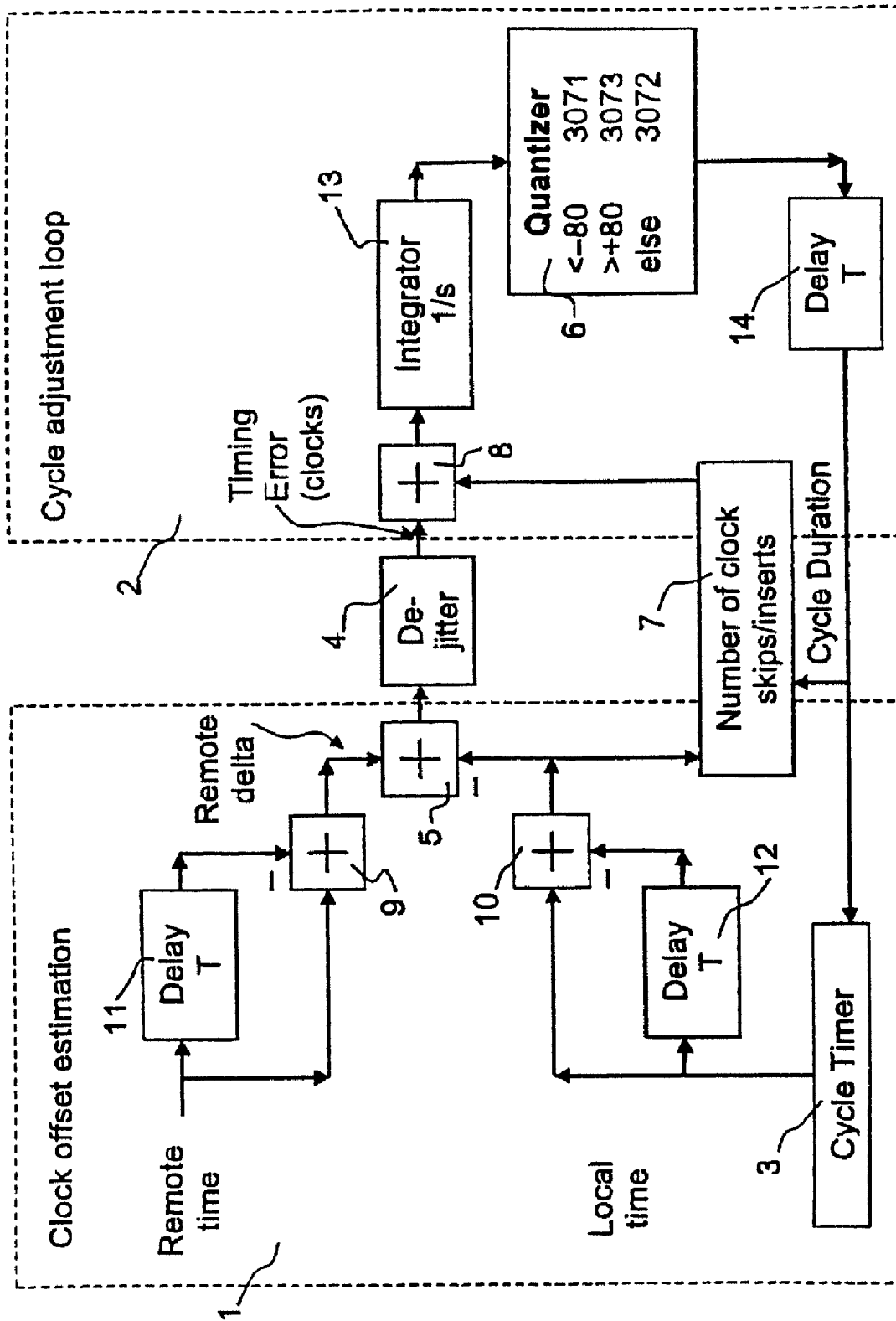
FIG. 3 shows a phase locked loop for cycle synchronization according to a preferred embodiment of the present invention.

According to the preferred embodiment of the present invention a special phase locked loop as shown in FIG. 3 is used to achieve the synchronization.

The cycle synchronizator shown in FIG. 3 comprises a clock offset estimation means to determine a timing error in clocks which is supplied to a cycle adjustment loop 2 preferably, as shown in FIG. 3, via a de-jitter filter 4. The cycle adjustment loop 2 in turn determines a new cycle duration which is supplied back to the clock offset estimation means 1.

In particular, the clock offset estimation means 1 receives the remote time which is supplied directly as minuent to a first adder 9 and via a first delay element 11 as subtrahend to the first adder 9. The first delay element 11 holds the preceding sample of the remote time, i.e. shows a FIFO-behaviour with a storage capacity of one sample. Therefore, the first adder 9 outputs a remote time delta, i.e. the time difference of the time in-between two samples of the time register of the reference node. This remote time delta is input as minuent to a second adder 5. Further, the clock offset estimation means 1 comprises the local cycle timer 3 of the cycle master. The local time output therefrom is input as minuent to a third adder 10 and via a second delay element 12 also as subtrahent to the third adder 10. The second delay element 12 shows the same delay T as the first delay element 11. Therefore, the third adder 10 outputs a local time delta corresponding in time to the remote time delta output by the first adder 9. This local time delta is input as subtrahent to the second adder 5 which outputs the timing error in clocks to the de-jitter filter 4 which inputs the filtered timing error in clocks to the cycle adjustment loop 2. Further, the local time delta output from the third adder 10 is input to a controller 7 which determines the number clock skips/inserts necessary on basis of an arithmetic operation subtracting the duration of a cycle in clocks for this period of time from that of an ideal cycle and multiplying the resulting difference by the quotient of the number of clocks between the previous sampling instant and this sampling instant with the duration of a cycle in clocks for this period of time.

The cycle adjustment loop 2 comprises a fourth adder receiving the timing error in clocks from de-jitter filter 4 as a first summand and the number of clock skips/inserts determined by the controller 7 as second summand to build their sum. This sum is supplied to an integrator 13 which outputs its integration result to a quantizer 6. The quantizer 6 determines whether the next cycle of the cycle timer 3 within the clock offset estimation means 1 should comprise 3071, 3072 or 3073 clocks. In case the integration result of the integrator 13 is smaller than −80 then the next cycle should comprise 3071 clocks, in case the integration result is bigger than 80 then the next cycle should comprise 3073 clocks and in case the output result of the integrator 13 equals to 80 the cycle should comprise 3072 clocks. This comparison introduces an hysteresis into the loop so that there are usually only differences of one clock in succeeding cycles, i.e. that there is usually no jump from 3071 to 3073, but either between 3072 and 3073 or between 3071 and 3072 clocks per cycle. Therefore, also another value than 80 cycles which equal to 10 ms might be used. The number of clocks output by the quantizer 6 is input to a third delay element 14 which also has the same delay T as the first delay element 11. The cycle duration output by the third delay element 14 is supplied to the controller 7 which determines the number of clock skips/inserts and to the cycle timer 13.

As mentioned above, the delay T of the first to third delay elements 11, 12, 14 are not fixed but depend on the reception of a transmitted remote time. Also, the delay T within the delay elements does not indicate a fixed or preset time, but that the sample and hold operation performed by the delay element is performed by all three delay elements simultaneously.

The phase locked loop for a cycle synchronization according to the preferred embodiment of the present invention shown in FIG. 3 adjusts the average difference between the remote time interval which is measured with the remote clock and the local time interval which is measured with the local clock plus a corrective difference to be zero.

Since without jitter or disturbances the delay of the transmission path between reference and cycle synchronizator is constant, the method according to the present invention uses exactly the time interval for the local and remote measurement. Since the respective oscillators used for the respective measurement might differ slightly with respect to their oscillation frequency, i.e. according to the IEEE 1394 standard +/−100 ppm are allowed, these measurements of local and remote time intervals do not give exactly the same number of clocks. The cycle synchronizator according to the present invention extracts the number of cycles n_cycles that have elapsed in the respective time interval and depending on the current cycle duration, the corrective number of clocks is set to be either +n_cycles, 0, or −n_cycles. Corrective values of −1, 0+1 per 3072 clocks as explained above is equivalent to an adjustment range of +/−166/3072=+/−325 ppm. Also larger corrective values might be used which—on the other hand—lead to higher local jitter and are therefore not preferred. Therefore, in the long run, the remote and local number of cycles are equalized.

As shown in FIG. 3 it is advantageous to insert a de-jitter filter 4 before the cycle timer adjustment loop. A suitable filter is a lowpass filter, but other filters, e.g. a running mean or a time-adaptive lowpass may also be used. By choosing a suitably high time constant in that filter which is independent from the clock synchronization loop the jitter can be eliminated.

Since the IEEE 1394 serial bus is a self-configuring bus, it is necessary that the network reference node is automatically determined after each network reconfiguration, e.g. after the addition or removal of nodes.

Figure 4:
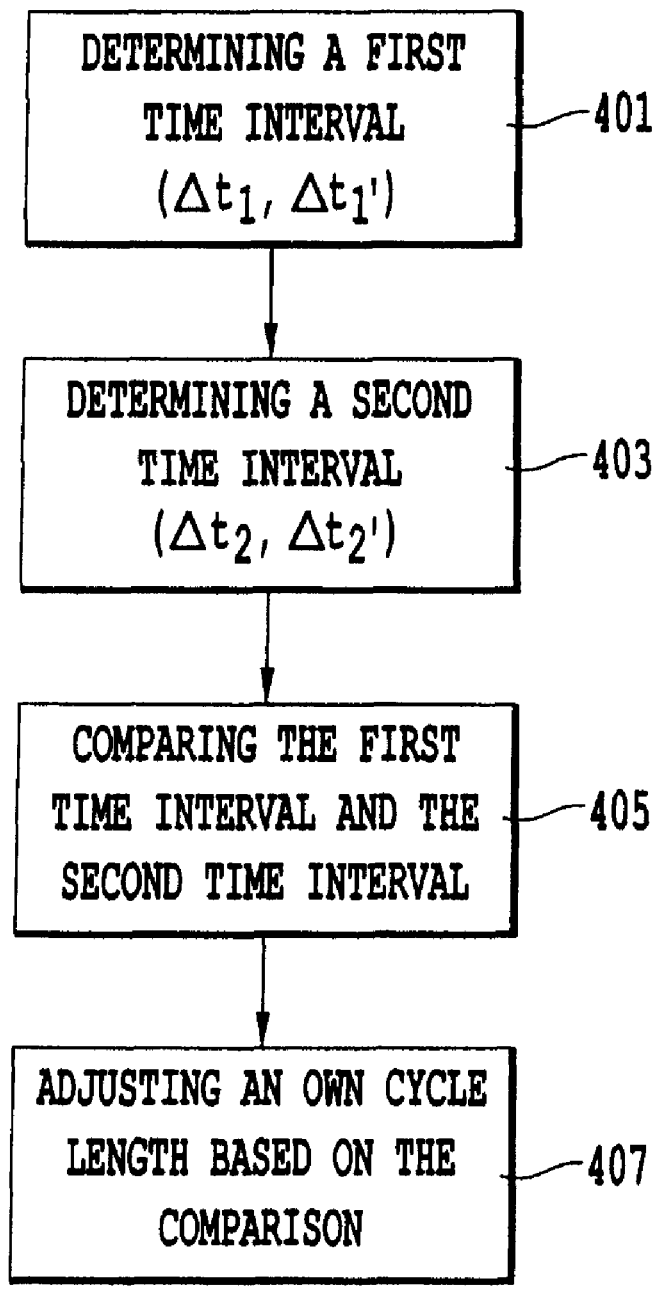
FIG. 4 shows a flowchart illustrating a method of performing a cycle synchronization between interconnected sub-networks.

FIG. 4 is a flowchart illustrating a method for performing a cycle synchronization between interconnected sub-networks, in which a reference node connected to one of the sub-networks transmits a respective cycle type time information to cycle masters of all other sub-networks at a recurring time instance, and the cycle masters of all other sub-networks adjust their cycle time accordingly.

In the first step 401, a first time interval ($\Delta t1$, $\Delta t1'$) is determined in-between two receptions of cycle time information from the reference node 30 with an own clock, in step 403 a second time interval ($\Delta t2$, $\Delta t2'$) is determined in-between two corresponding transmissions of cycle time information from the reference node 30 based on the received cycle time information, in step 405 the first time interval is compared to the second time interval, and in step 407 the own cycle length is adjusted according to the comparison result.

Therefore, according to the present invention the oscillator is not adjusted, but the number of clocks within one cycle. Therefore, a free-running oscillator can be used instead of a voltage controlled oscillator. This feature enables the integration of the cycle synchronization according to the present invention on a single chip. Further, as mentioned above, the present invention performs the cycle synchronization independently of the connecting channel in-between the different sub-networks, i.e. IEEE 1394 serial buses which basically need only slight modifications in that the cycle synchronizator according to the present invention has to be included into a respective cycle master of a sub-network. Further, the connection network needs no master clock, since one of the sub-networks serves as reference.

What is claimed is:

1. A method to perform a cycle synchronization between interconnected sub-networks, comprising:
    transmitting a respective cycle time information from a reference node connected to one of the sub-networks to cycle masters of all other sub-networks at recurring time instants the cycle time information transmitted by the reference node is a content of a cycle time register thereof; and
    adjusting the cycle time of the cycle masters in accordance with the transmission, the adjustment of the cycle time within a cycle master is performed by adjusting the average difference between a time interval of two transmissions of cycle time information of the reference node which is determined by subtracting two succeeding received contents of the cycle time register of the reference node and a time interval of two samplings of the cycle timer which is determined by subtracting two succeeding sample contents of the cycle time register plus a corrective difference to be zero.

2. The method according to claim 1, wherein the corrective difference corresponds to the preceding adjustment.

3. The method according to claim 1, wherein the recurring time instants are determined according to a regular time interval with a small variation.

4. A network node device configured to synchronize cycles in a sub-network, the network node device comprising:
    a local cycle timer; and a cycle synchronizer that comprises:
  a clock offset estimation means for determining a timing error of the local cycle timer, the timing error representing a frequency deviation between the local cycle timer and a remote cycle timer; and
  a cycle adjustment loop configured to receive the timing error and to adjust a cycle length of the local cycle timer to a cycle length of the remote cycle timer by adapting the number of ticks per cycle in the local cycle timer to reduce timing error with respect thereto.

5. The network node device according to claim 4, further comprising:
  a dc-jitter filter arranged between the clock offset estimation means and the cycle adjustment loop configured to low-pass filter said determined timing error.

6. A method for performing cycle synchronization in a network of a plurality of interconnected busses, one of which including a reference node and the others of which each comprises a cycle master, comprising:
  receiving, at one or more of said cycle masters, cycle time information from said reference node; and
  adjusting a cycle length at said one or more of said cycle masters respectively, by a value selected from the group consisting of +n, and −n ticks based on said received cycle time information if the received cycle time information deviates from a predetermined value by more than a predetermined amount.

7. The method of claim 6, where n=1.

8. A method for performing cycle synchronization in a network comprising a plurality of interconnected busses one of which includes a reference node device and the others of which each including a cycle master device, comprising:
  adjusting a cycle duration that determines a cycle frequency of one of said busses including the reference node device or the cycle master device by a correction value selected from +n, and −n ticks if a deviation of the cycle duration deviates from a predetermined value by more than a predetermined amount.

9. The method of claim 8, wherein said adjusting of a cycle duration further comprises:
  adjusting the number of ticks per cycle of a cycle timer of a node device local to said one bus.

10. The method of claim 8, wherein said adjusting is effected on the basis of cycle time information received from a node device remote to said one bus.

11. The method of claim 10, wherein said adjusting is effected on the basis of cycle time information.

12. The method of claim 8, wherein said adjusting yields subsequent cycles whose number of cycle ticks does not differ by more than the correction value.

13. The method of claim 8, wherein n=1.

14. A cycle synchronizer for use in a network, comprising:
  a plurality of interconnected busses, including:
    a local cycle timer; and
    means for adjusting a cycle duration that determines a cycle frequency of said local cycle timer by a correction value selected from +n, and −n ticks if a deviation of said cycle duration from a reference cycle duration exceeds a predetermined value.

15. The cycle synchronizer of claim 14, further comprising:
  means configured for receiving cycle time information, where said cycle synchronizer is configured to effect said cycle duration adjustment on the basis of said received cycle time information.

16. The cycle synchronizer of claim 14, wherein said cycle synchronizer is configured to effect said cycle duration adjustment such that the number of cycle ticks in subsequent cycles does not differ by more than the correction value.

17. The cycle synchronizer of claim 14, wherein n=1.

18. A network comprising:
  a plurality of interconnected busses including a first bus and a second bus remote to said first bus; and
  a first network device as a local node of said first bus, wherein said first network device includes,
    a local cycle timer; and
    cycle duration adjustment means configured for adjusting cycle duration that determines a cycle frequency of said local cycle timer by a correction value selected from +n, and −n ticks if a deviation of said cycle duration from a reference cycle duration exceeds a predetermined value;
  said first network device is configured such that said cycle frequency of said cycle timer dictates a cycle frequency of said first bus.

19. The network device of claim 18, wherein said cycle duration adjustment means is configured to effect said adjusting of said cycle duration such that the number of cycle ticks in subsequent cycles does not differ by more than the correction value.

20. The network device of claim 18, wherein n=1.

21. The network of claim 18, comprising:
  a second network device local to said second bus and configured to transmit cycle time information; and
  clock offset estimation means, local to said first bus, configured for receiving said cycle time information, for establishing an estimation of cycle synchronization between said first bus and said second bus on the basis of said received cycle time information and for providing information on the basis of which said cycle duration adjustment means performs said adjusting.

22. The network of claim 21, wherein said second network device is configured to transmit cycle time information at regular intervals.

23. The network of claim 21, wherein said cycle time information is indicative of content of a cycle time register of said second network device.

24. The network of claim 23, wherein said second network device further comprises a cycle timer, the cycle frequency of which dictates a cycle frequency of said second bus, wherein said cycle timer includes said cycle time register.

25. A device for performing cycle synchronization in networks including
  plurality of local networks in which at least there are a reference node and cycle masters which are connecting to said local networks respectively, the device comprising:
  a receiving unit configured to receiving a reference cycle time information supplied from said reference node and local cycle time information stored in a register of said cycle master connected to said local network;
  means for detecting a difference between said reference cycle time information and local cycle time information; and
  means for adjusting counter value of said register based on the detected difference in order to perform said cycle synchronization so that the counter value selected from ternary values consisting of high, middle and low, wherein said adjustment of a center value is limited to +/−1 value and the adjustment is only allowed to jump between middle and high or between middle to low.

26. A method to perform a cycle synchronization between interconnected networks using a reference node as a cycle time master and one or more cycle masters having adjustable own clocks, each of the cycle masters connected to a different one of the interconnected networks, the reference node transmitting a master cycle time information to all other cycle masters at recurring time instants and the cycle masters synchronize the cycle time based on at least the transmitted master cycle time information, the synchronization of the cycle time of the respective cycle master comprising:

receiving master cycle time information at the recurring time instants;

storing the received master cycle time information in a first storage means; storing cycle time information of the cycle master's own clock in a second storage means;

determining a first deviation between the received master cycle time information and previously stored master cycle time information;

determining a second deviation between the cycle master's current cycle time and a previously stored cycle time of the same cycle master; and comparing the determined first deviation and second deviation and adjusting the cycle master's cycle time.

* * * * *